(12) United States Patent
Lyon

(10) Patent No.: US 9,865,302 B1
(45) Date of Patent: Jan. 9, 2018

(54) VIRTUAL VIDEO EDITING

(75) Inventor: Barrett Gibson Lyon, Pacifica, CA (US)

(73) Assignee: TATA COMMUNICATIONS (AMERICA) INC., Herndon, VA (US)

( * ) Notice: Subject to any disclaimer, the term of this patent is extended or adjusted under 35 U.S.C. 154(b) by 531 days.

(21) Appl. No.: 12/316,807

(22) Filed: Dec. 15, 2008

(51) Int. Cl.
- *H04N 9/80* (2006.01)
- *G11B 27/00* (2006.01)
- *G11B 27/02* (2006.01)

(52) U.S. Cl.
CPC .......... *G11B 27/00* (2013.01); *G11B 27/005* (2013.01); *G11B 27/02* (2013.01)

(58) Field of Classification Search
CPC .......................... G06K 9/00711; G11B 27/034
USPC .......................... 386/215, 216, 217, 218, 241
See application file for complete search history.

(56) References Cited

U.S. PATENT DOCUMENTS

| | | | | |
|---|---|---|---|---|
| 5,959,690 | A * | 9/1999 | Toebes et al. | 348/578 |
| 6,154,771 | A * | 11/2000 | Rangan | H04N 5/76 345/660 |
| 6,957,008 | B1 * | 10/2005 | Yasui | 386/281 |
| 7,434,154 | B2 * | 10/2008 | Konetski | 715/203 |
| 7,624,337 | B2 * | 11/2009 | Sull et al. | 715/201 |
| 7,818,355 | B2 | 10/2010 | Mills et al. | |
| 8,055,783 | B2 * | 11/2011 | Brannon, Jr. | H04N 21/23608 709/219 |
| 8,099,407 | B2 * | 1/2012 | Auerbach et al. | 707/709 |
| 2003/0076881 | A1 * | 4/2003 | Akiyoshi et al. | 375/240.01 |
| 2004/0093618 | A1 * | 5/2004 | Baldwin | H04N 7/17336 725/101 |
| 2004/0237043 | A1 * | 11/2004 | Shima | 715/530 |
| 2004/0268398 | A1 * | 12/2004 | Fano et al. | 725/88 |
| 2006/0224940 | A1 * | 10/2006 | Lee | 715/500.1 |
| 2007/0162945 | A1 | 7/2007 | Mills | |
| 2007/0209005 | A1 * | 9/2007 | Shaver et al. | 715/733 |
| 2008/0016114 | A1 * | 1/2008 | Beauregard et al. | 707/104.1 |
| 2008/0091845 | A1 | 4/2008 | Mills et al. | |
| 2008/0235200 | A1 | 9/2008 | Washington et al. | |
| 2009/0013414 | A1 | 1/2009 | Washington et al. | |
| 2009/0276807 | A1 * | 11/2009 | Robotham | 725/40 |
| 2010/0070608 | A1 * | 3/2010 | Hosur | 709/218 |
| 2010/0094931 | A1 | 4/2010 | Hosur et al. | |

OTHER PUBLICATIONS

"New Feature: Link within a Video," Google Video Blog, Jul. 19, 2006, http://googlevideo.blogspot.com/2006/07/new-feature-link-within-video_19.html.

Jason Kincaid, "YouTube Enables Deep Linking Within Videos," TechCrunch.com, Oct. 25, 2008, http://www.techcrunch.com/2008/10/25/youtube-enables-deep-linking-within-videos/.

* cited by examiner

*Primary Examiner* — Thai Tran
*Assistant Examiner* — Jose Mesa
(74) *Attorney, Agent, or Firm* — Hubbs, Enatsky, Inoue PLLC

(57) ABSTRACT

Virtual video editing is disclosed. In some embodiments, a definition of a virtual clip of a source file is received from a user and saved for future playback of the virtual clip. The virtual clip is not encoded as a separate file. Rather, a portion of the source file specified in the definition of the virtual clip is played back when the virtual clip is played.

6 Claims, 9 Drawing Sheets

VIRTUAL VIDEO EDITING

BACKGROUND OF THE INVENTION

Typically, in order to create a clip of a source video file, the portion of the source video file to be included in the clip must be encoded as a separate video file. The creation of a separate video file for a clip of a source video file is both processing and storage intensive.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Figure 1:
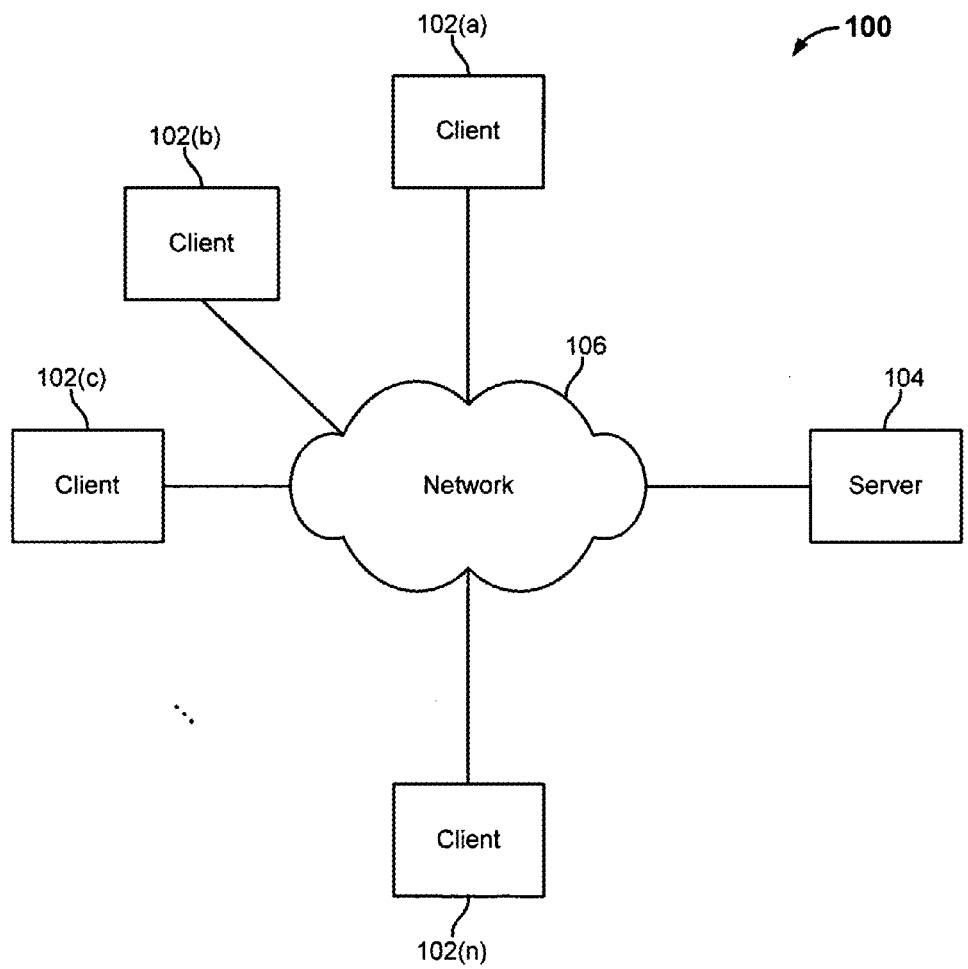
FIG. 1 is a block diagram illustrating an embodiment of a client-server network environment.

FIG. 1 is a block diagram illustrating an embodiment of a client-server network environment 100. Clients 102 and server 104 communicate via network 106, which may comprise a private network such as a Local Area Network (LAN) or a public network such as the Internet. Although a single server 104 is depicted in the given example, server 104 may comprise a plurality of servers, one or more of which may be network connected. In some embodiments, server 104 comprises a streaming media server and services requests for media content from one or more clients 102. For example, server 104 may comprise a streaming video server. A requested video file or portion thereof received from server 104 may be viewed at client 102 using an appropriate media player, which may support any one or more appropriate media file formats such as Flash video. The media player at the client-side, for example, may comprise an external application at client 102 or may comprise an embedded player in a website being accessed by client 102. In some embodiments, a custom media player may be employed that not only allows viewing of video content but also allows a video file to be virtually edited and/or shared.

In some embodiments, a custom media player provides a user interface, such as a graphical user interface, to facilitate virtual editing of a video file. The virtual editing features of such a media player may include, for example, the ability for a user to specify start and stop points within a video file to create a virtual clip of the video file, the ability for a user to share a virtual clip of a video file with one or more other users, the ability for a user to include other content (e.g., pop-ups, bubbles, comments, notes, etc.) within a virtual clip and/or a video file, the ability for a user to specify an array of start and stop points to create a plurality of virtual clips from one or more video files that may be sequentially seamed together in a user specified order to create a composite virtual clip for playback, the ability for a user to include or specify one or more transitions between one or more individual virtual clips comprising a composite virtual clip, etc. As further described below, such virtual editing features do not edit the source video file(s) to create the virtual clip(s) but rather facilitate specifying instructions for an associated server of the manner in which to serve data comprising the source video file(s) and/or for an associated media player of the manner in which to playback the data.

Although video content may be described in some examples, the techniques described herein may be similarly employed with respect to any type of source file, including other types of media files. As used herein, the term "virtual clip" refers to at least a portion of a source file. The clip is "virtual" in the sense that no actual file is generated and/or stored for the virtual clip. In some cases, a virtual clip comprises the duration of video data between and including specified start and stop points. In various embodiments, the start and stop points may be specified using any appropriate marker types, such as time codes, byte offsets, key frame numbers, etc. In some embodiments, a virtual clip of a source file comprises the entire source file. As used herein, the term "composite virtual clip" refers to a specification of a set of virtual clips and/or transitions between one or more virtual clips of the set, e.g., for seamless playback in a prescribed order. The virtual clips comprising a composite virtual clip may be associated with one or more different source files. For example, virtual clips from different video files may be combined to produce a composite virtual clip. In some embodiments, any appropriate transitions may be specified between one or more consecutive virtual clips comprising a composite virtual clip. Although some of the examples described herein are with respect to virtual clips, some of the described techniques may be similarly employed with respect to composite virtual clips.

Figure 2A:
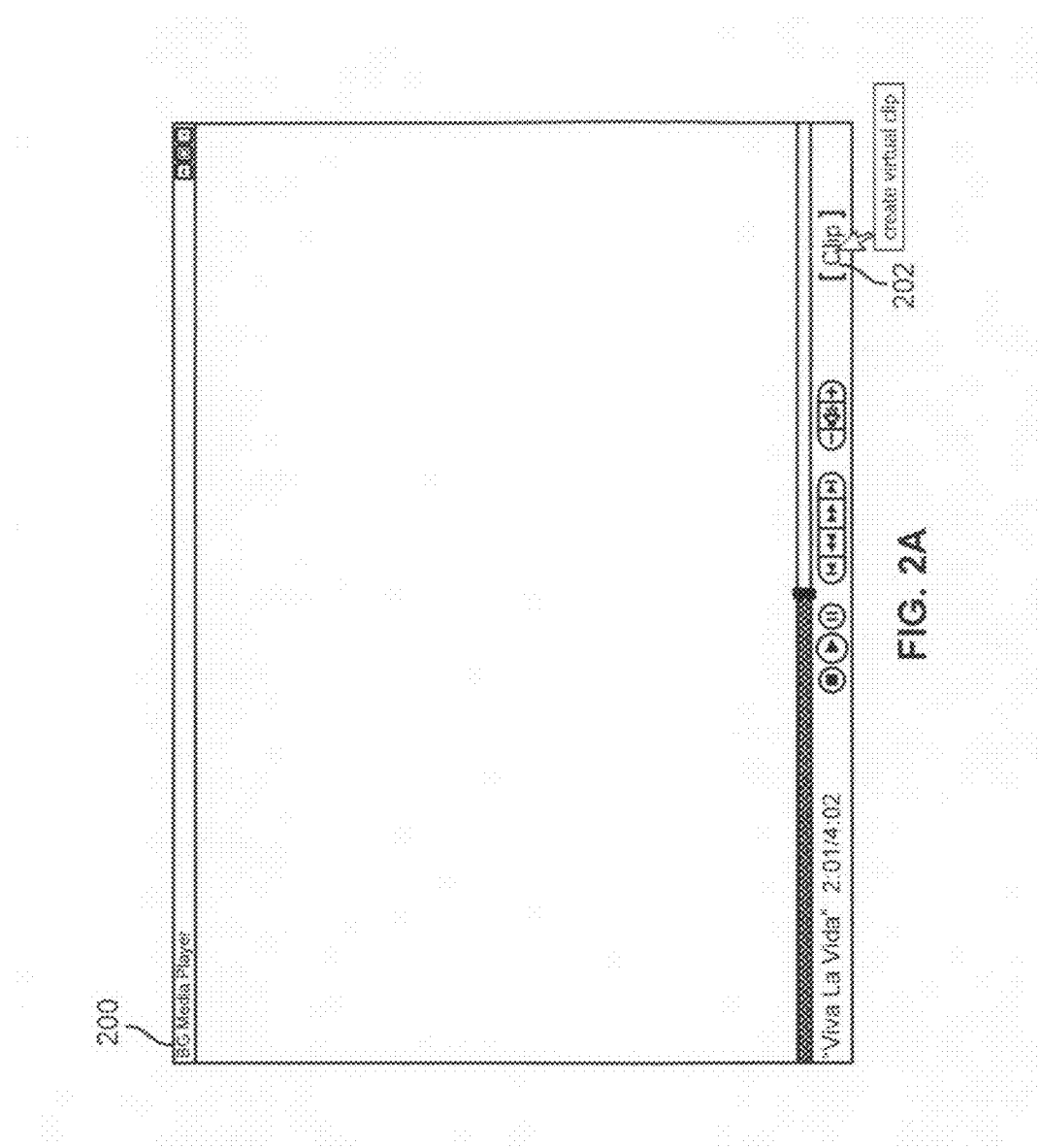
FIGS. 2A-B illustrate various aspects of an embodiment of a media player that supports virtual editing of a video file and sharing of virtual clips.
Figure 2B:
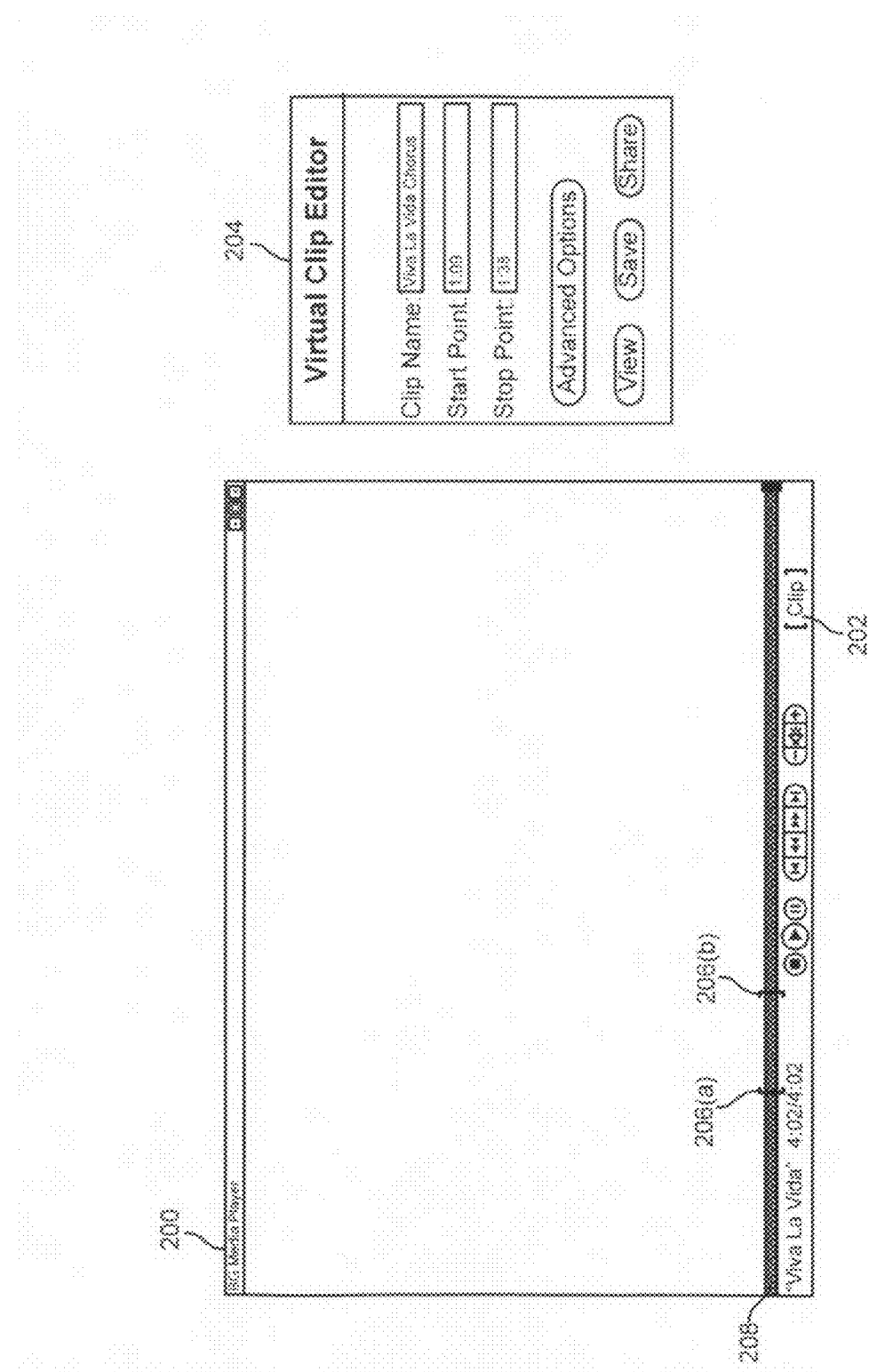

FIGS. 2A and 2B illustrate various aspects of an embodiment of a media player that supports virtual editing of a video file and/or sharing of virtual clips. FIG. 2A illustrates an embodiment of a user interface of a media player 200. In some embodiments, media player 200 comprises a custom media player. In various embodiments, media player 200 may comprise an external application at a client or an embedded player in a website being accessed by a client. Media player 200 includes various standard playback options as well as an option 202 to create a virtual clip. As depicted in FIG. 2B, a virtual clip editor user interface 204 and a pair of markers 206 on scrubber bar 208 of player 200 are presented in response to the selection of an option 202 to create a virtual clip. In the given example, markers 206 comprise opening and closing brackets and represent the start and stop points of a virtual clip, respectively. In some cases, a plurality of sets of markers similar to markers 206 may be provided with respect to a media player user interface to define a plurality of virtual clips.

A user may slide around markers 206 on scrubber bar 208 to select a desired clip of a video file. In some embodiments, the start and stop points of a virtual clip are automatically entered into the associated fields in virtual clip editor 204 based on the positions of markers 206 on scrubber bar 208 and are accordingly updated as markers 206 are moved around on scrubber bar 208. Alternatively, a user may manually enter and/or edit the start and/or stop points in the corresponding fields in virtual clip editor 204. In such cases, the associated markers 206 may automatically be moved on scrubber bar 208 to reflect the entered start and/or stop points. In the example of FIG. 2B, both the start and stop points are represented by time codes. In other embodiments, the start and stop points may be specified using any other appropriate marker types, such as byte offsets or key frame numbers. In some embodiments, the start and stop points may be specified using different marker types. For example, the start point may be specified by a time code, and the stop point may be specified by a key frame number.

In the example of FIG. 2B, virtual clip editor 204 additionally provides a text field to enter a name or other identifier for the virtual clip being created. In various embodiments, virtual clip editor 204 may include one or more other options, such as options to specify and/or define other content (e.g., pop-ups, bubbles, comments, notes etc.) to be included within the virtual clip, options to define a composite virtual clip and/or transitions between virtual clips comprising a composite virtual clip, etc. In the given example, such additional options may be accessed via the "Advanced Options" button of virtual clip editor 204. Virtual clip editor 204 also provides options to view, save, and/or share the specified virtual clip.

Selection of the "View" option in virtual clip editor 204 results in the virtual clip to be played in media player 200. When a virtual clip is played, scrubber bar 208 of media player 200 represents only the duration of the virtual clip in some embodiments. Alternatively, although only the portion corresponding to the virtual clip may be played when an option to view or play a virtual clip is selected, in some embodiments, scrubber bar 208 represents the timeline of the entire source file from which the virtual clip was created so that a user can still view or play other portions of the source file not included in the virtual clip if desired. In some such cases, the portion of the source file associated with the virtual clip may be indicated on scrubber bar 208 using markers 206, and a user may have the ability to move the playhead beyond the markers to play portions of the source file outside the virtual clip. When playing a composite virtual clip, scrubber bar 208 may similarly represent the duration of only the composite virtual clip or may include the timelines associated with the source files of one or more virtual clips comprising the composite virtual clip.

Selection of the "Save" option in virtual clip editor 204 results in information used to define a virtual clip to be saved. In various embodiments, a virtual clip definition or part thereof may be saved at a client and/or at an associated media server. For example, the definition of a virtual clip may be saved client-side with respect to an external media player or an embedded media player in a website. In such cases, when the virtual clip is desired to be played, the player at the client includes the definition of the virtual clip with a request for the virtual clip to the server. Alternatively, the definition of a virtual clip may be saved server-side, and an identifier, link, or other reference associated with the virtual clip may be employed to access the virtual clip from the server at a client.

In some embodiments, information used to define a virtual clip is saved as a URL (Uniform Resource Locator) and/or an associated hyperlink that can be used to retrieve the data associated with the virtual clip from an associated server. In FIG. 2B, for example, the virtual clip definition may be saved as a URL such as http://node.comNivaLaVida.flv?start=1:09&stop=1:38/"Viva La Vida Chorus". In some embodiments, a virtual clip definition includes all of the information needed to generate the virtual clip from its source file. For example, a virtual clip definition may include an identifier associated with the source file, start and/or stop points, an identifier selected for the virtual clip, information related to any other content to be included in the virtual clip, etc. Similarly, the definition of a composite virtual clip may comprise the definitions of one or more virtual clips, the specification of a sequential order in which the virtual clips are to be played, information related to one or more transitions to be included between virtual clips, etc.

In some embodiments, the selection of an option to play a virtual clip results in the virtual clip to be requested by an associated player from an associated server, which is configured to parse and interpret the virtual clip definition (e.g., a URL associated with the virtual clip) so that the appropriate content of the source file can be served. Thus, when defining a virtual clip, the source file associated with the virtual clip is not modified in any way nor is a new media file created from the source file for the virtual clip. Rather, in response to a request for a particular virtual clip, an appropriate portion of the source file is provided by the server.

Selection of the "Share" option in virtual clip editor 204 results in an interface to be provided that allows a user to specify one or more other users and/or clients with which to share a virtual clip. Each other user may be specified by an appropriate identifier such as email address, IM (Instant Messenger) identifier, phone number, SMS (Short Message Service) identifier, etc. In some embodiments, a link to the virtual clip or URL associated with the virtual clip is sent to each user with which the virtual clip is desired to be shared. A user who receives a shared virtual clip may select the link or input the URL into a web browser to view the shared virtual clip via a media player at the associated client of the user. In response to the request for the virtual clip via the URL, an associated server provides the data comprising the virtual clip to a media player at the client of the user. In some embodiments, a media player that supports virtual clip editing and/or playback is needed at a client of a user who receives a shared virtual clip to view and/or further edit the clip.

The examples provided with respect to FIGS. 2A and 2B comprise some embodiments of a user interface of a media player that supports virtual clips. In other embodiments, any appropriate user interface and/or media player configuration may be employed that supports one or more options for virtual editing, playback, and/or sharing of virtual clips.

Figure 3:
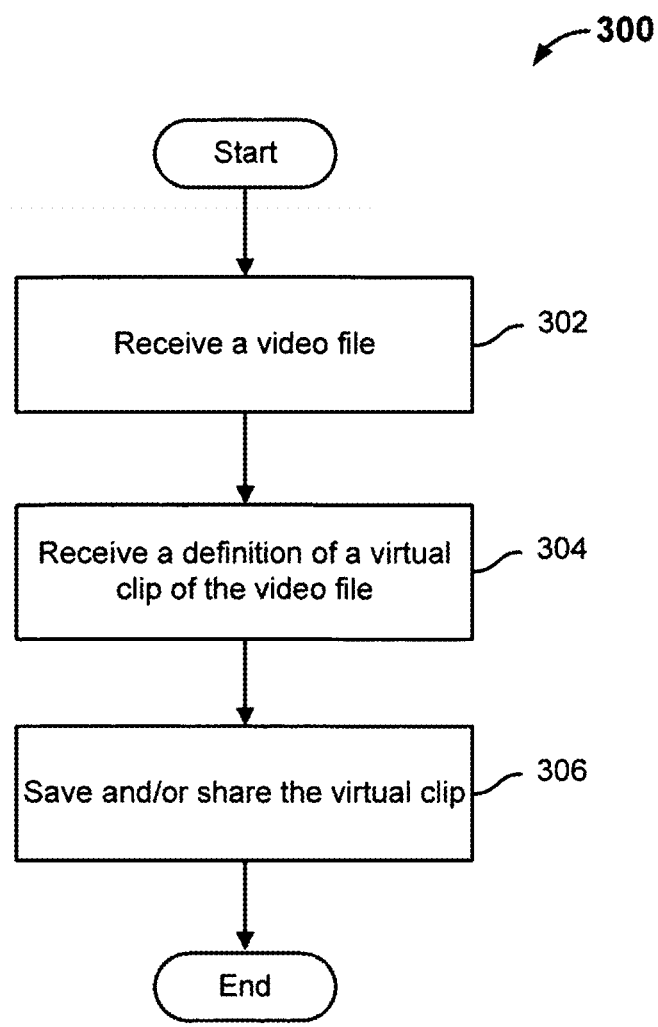
FIG. 3 illustrates an embodiment of a process for defining a virtual clip.

FIG. 3 illustrates an embodiment of a process for defining a virtual clip. In some embodiments, process 300 is employed with respect to a media player such as that depicted in FIGS. 2A-2B. Process 300 starts at 302 at which a video file is received at a client from a server, e.g., in response to a request for the video file from the client to the server. In some embodiments, at 302 the video file is streamed over a network from the server to a (custom) media player at the client via which the video file is viewed at the client by a user of the client. In various embodiments, the media player at the client may comprise an external application at the client or an embedded player in a website being accessed by the client. In some embodiments, the media player includes virtual editing options. In some embodiments, if the video file already exists client-side, 302 includes opening the video file in a media player at the client rather than receiving the video file from an associated server. At 304, a definition of a virtual clip of the video file is received. For example, the definition may be received via a user interface associated with the media player for defining virtual clips. In various embodiments, the definition may include a name or other identifier for the virtual clip, start and/or stop points of the virtual clip within the source file, information related to other content (e.g., pop-ups, bubbles, notes, comments, etc.) to be included in the virtual clip, etc. At 306, the virtual clip is saved and/or shared in response to the selection of associated options, and process 300 subsequently ends. In various embodiments, a virtual clip definition may be saved client-side and/or server-side. In some embodiments, a virtual clip definition is saved as a URL and/or an associated hyperlink that can be employed to retrieve the data associated with the virtual clip from an associated server. If an option to share the virtual clip is selected, a specification of one or more other users or clients with which to share the virtual clip is received, and an associated URL or link of the virtual clip is sent to each of the other users at 306 via which the other users may request the virtual clip from an associated server at which the source file of the virtual clip is stored.

Figure 4:
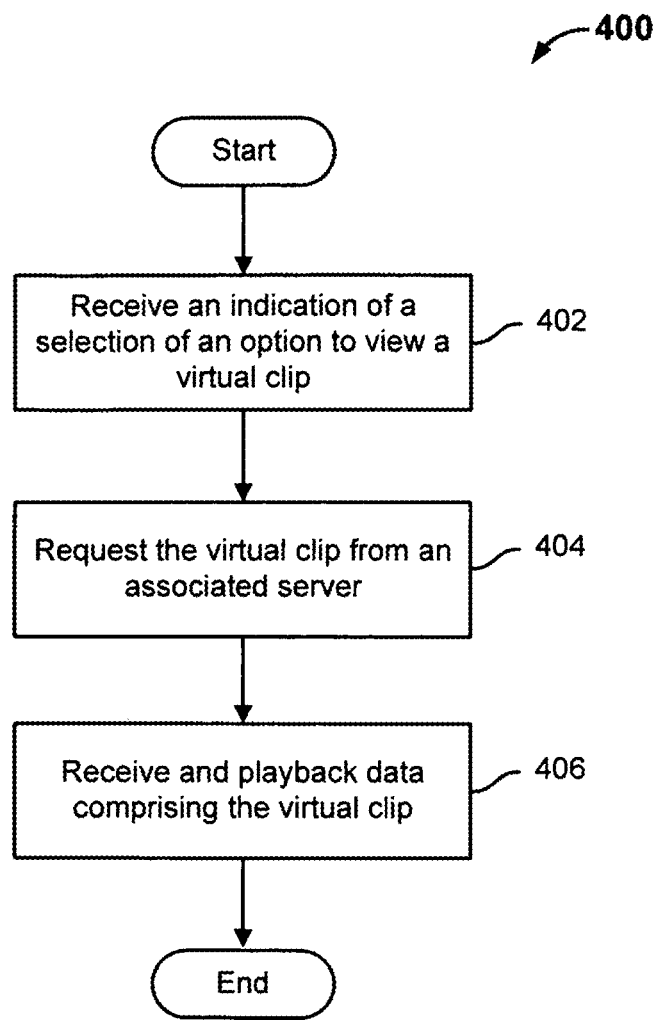
FIG. 4 illustrates an embodiment of a process for viewing a virtual clip at a client.

FIG. 4 illustrates an embodiment of a process for viewing a virtual clip at a client. Process 400 starts at 402 at which an indication of a selection of an option to view a virtual clip is received. In some embodiments, for example, an option to view the virtual clip may be selected via an associated media player. In some embodiments, a selection of an option to view a virtual clip may comprise clicking on or otherwise selecting a hyperlink associated with the virtual clip or inputting a URL associated with the virtual clip into a web browser. At 404, the virtual clip is requested from an associated server. In some embodiments, the request includes defining elements of the virtual clip, such as a source file identifier, start and/or stop points within the source file, a virtual clip identifier, a specification of content other than that included in the associated portion of the source file to the be included in the virtual clip, etc. In some embodiments, the request is part of a URL associated with the virtual clip. In some cases, the request for the virtual clip comprises an HTTP GET or POST request. In some embodiments, the virtual clip is requested by a client-side media player. In some embodiments, the virtual clip is requested from an associated server at 404 only if the virtual clip does not exist and/or is not already cached client-side. At 406, data comprising the virtual clip requested at 404 is received and played back, and process 400 subsequently ends. In some embodiments, the data comprising the virtual clip is received and/or played back by a media player at the client. In some cases, the data received at 406 is buffered for seamless playback at the client. In some embodiments, only the data comprising the virtual clip is received at 406. In other embodiments, the entire source file associated with the virtual clip is received at 406. In such cases, only the portion of the source file associated with the virtual clip may be played back by the player; however, a user may have options to playback the entire source file and/or to scrub to other parts of the source file outside of the virtual clip.

Figure 5:
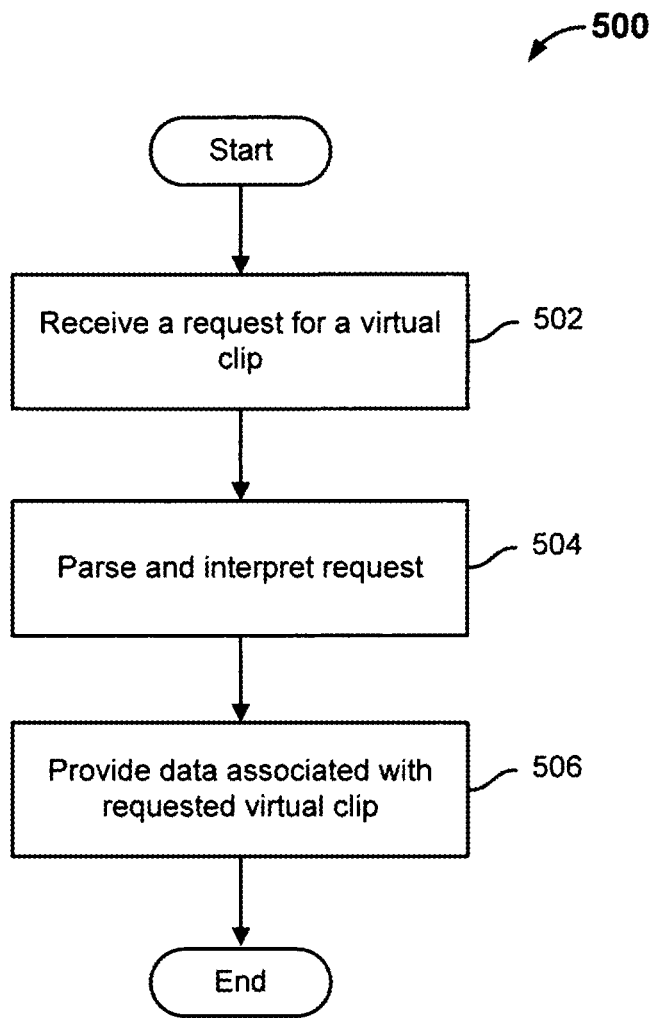
FIG. 5 illustrates an embodiment of a process for servicing a request for a virtual clip.

FIG. 5 illustrates an embodiment of a process for servicing a request for a virtual clip. For example, process 500 may be employed by a server that hosts a source file from which a virtual clip is defined. Process 500 starts at 502 at which a request for a virtual clip is received. In some embodiments, the request includes defining elements of the virtual clip, such as a source file identifier, start and/or stop points within the source file, a virtual clip identifier, a specification of content other than that included in the associated portion of the source file to the be included in the virtual clip, etc. In some embodiments, the request is received via a URL. In some embodiments, the request comprises an HTTP GET or POST request. In some embodiments, the request is received from a media player at a client. At 504, the request received at 502 is parsed and interpreted, e.g., by a server that receives the request. At 506, data associated with the requested virtual clip is provided in response to the request, and process 500 ends. In some embodiments, the data structure of the data provided at 506 is similar to that of a standard video file. For example, in addition to the video content of the associated source file between and including the specified start and/or stop points, the virtual clip may be associated with a unique file name; may include a (falsified) header that includes, for example, time length data that matches exactly with the length of the virtual clip; may include key frames at the specified start and/or stop points, which, in some cases, may be specially generated if key frames do not exist in the source file at those points; etc.

Figure 6:
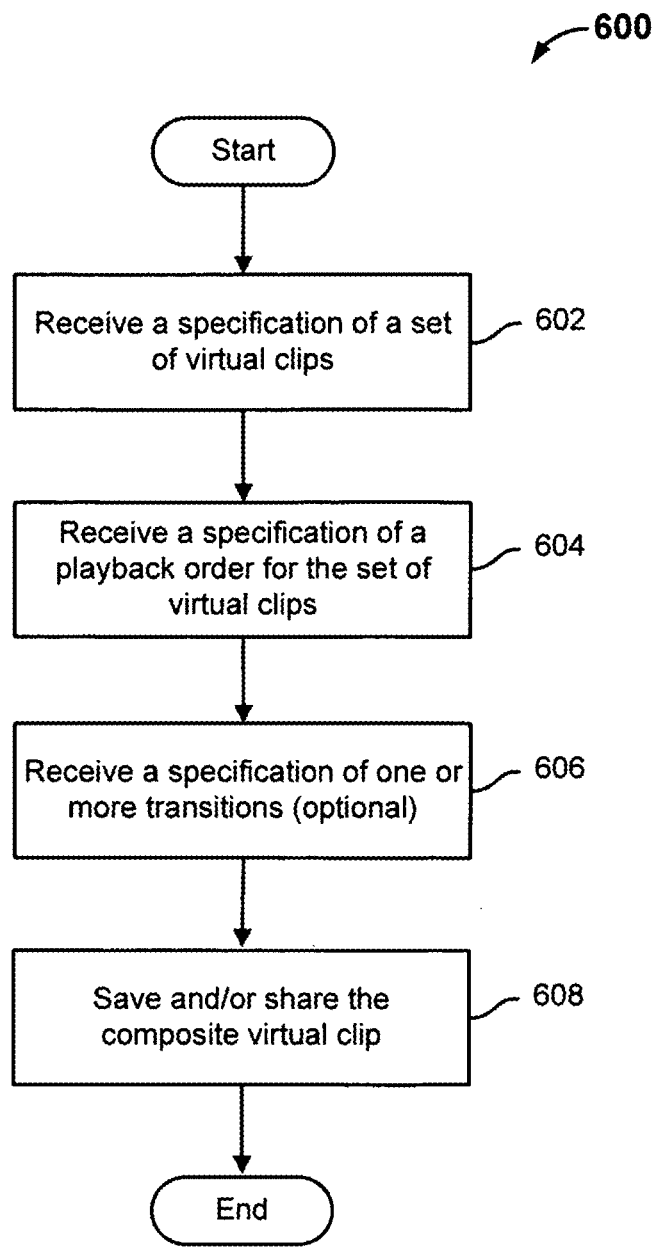
FIG. 6 illustrates an embodiment of a process for defining a composite virtual clip.

FIG. 6 illustrates an embodiment of a process for defining a composite virtual clip. In some embodiments, process 600 is employed with respect to a media player such as that depicted in FIGS. 2A-2B. At 602 a specification of a set of virtual clips is received. For example, the specification may be received via a user interface associated with a media player for defining virtual clips. In various embodiments, the set of virtual clips may be associated with one or more source video files. At 604, a specification of a sequential order in which the set of virtual clips is to be played back is received. In some embodiments, the order may be inferred at 604 from the order in which the virtual clips are specified at 602. Process 600 includes optional step 606 at which a specification of a set of one or more transitions between one or more consecutive pairs of virtual clips is received. In some embodiments, different transitions may be selected and/or specified between different virtual clips. In some embodiments, no transitions may be selected and/or specified between one or more virtual clips of a composite virtual clip. At 608, the composite virtual clip is saved and/or shared in response to the selection of associated options, and process 600 subsequently ends. In various embodiments, a composite virtual clip definition may be saved client-side or server-side. In some embodiments, a composite virtual clip definition is saved as a URL and/or an associated hyperlink that can be employed to retrieve the data associated with the composite virtual clip from one or more associated servers. If an option to share the composite virtual clip is selected, a specification of one or more other users or clients with which to share the composite virtual clip is received, and an associated URL or link of the composite virtual clip is sent to each of the other users at 608 via which the other users may request the composite virtual clip from one or more associated servers at which the source files of the virtual clips comprising the composite virtual clip are stored.

In various embodiments, any appropriate transitions may be selected and/or defined between one or more consecutive virtual clips comprising a composite virtual clip. In some embodiments, a transition is defined between the last key frame of a given virtual clip and the first key frame of the next sequential virtual clip. As further described below, either or both of the aforementioned last key frame and first key frame may comprise virtual key frames. In various embodiments, a transition may comprise a virtual fade (e.g., forward fade, reverse fade, top fade, etc.), morphing, animation, video processing sequence, etc. In some embodiments, a custom transition may be defined. For example, a transition may comprise an advertisement. In various embodiments, transition definitions may be programmed into a (custom) media player and/or may reside server-side. In the cases in which transition definitions are programmed into the player, the processing associated with generating the transitions is performed client-side by the player. In the cases in which transition definitions reside server-side, the transitions are generated server-side and streamed from the server to the player at the client. In some such cases, one or more dedicated transition video servers may be configured to generate and serve transitions. In some embodiments, a transition may be treated as another virtual clip in a composite virtual clip. For example, a composite virtual clip comprising Clip A, Transition, and Clip B may be treated as Clip 1, Clip 2, and Clip 3 which correspond to Clip A, Transition, and Clip B, respectively.

Figure 7:
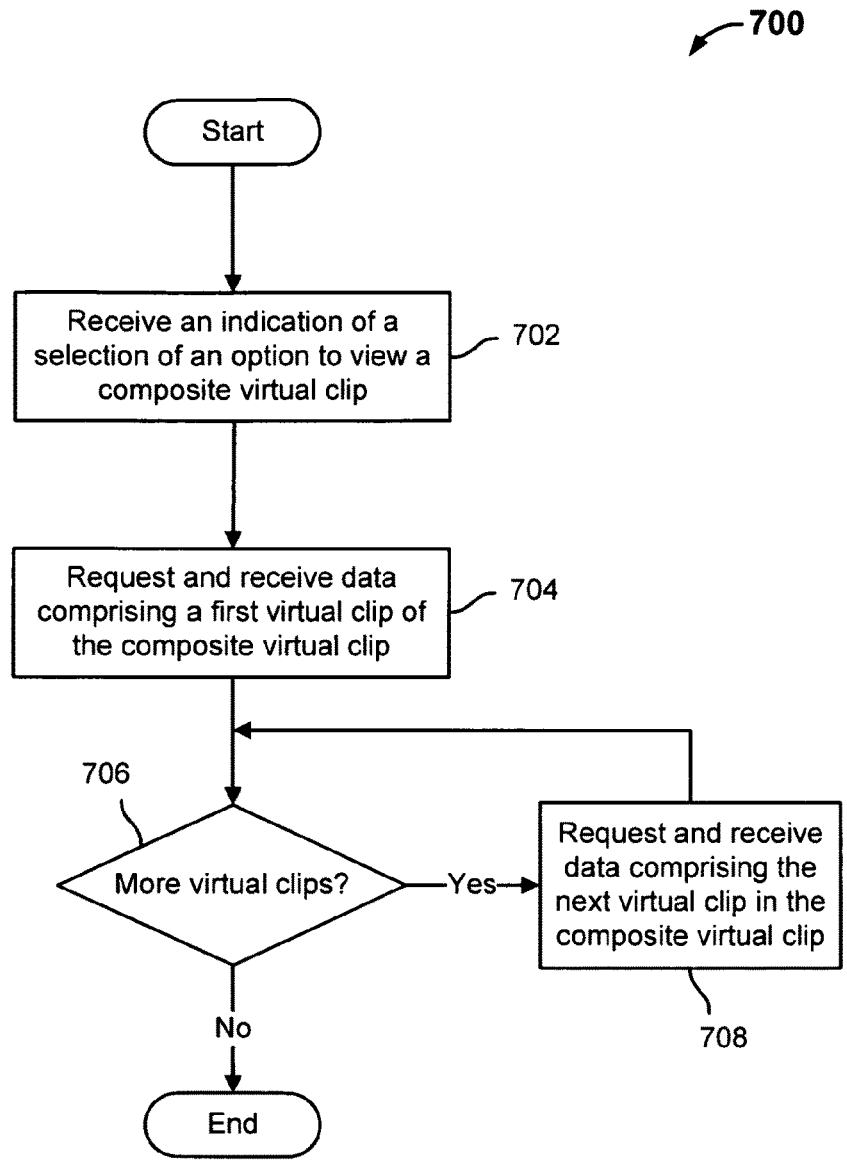
FIG. 7 illustrates an embodiment of a process for obtaining a composite virtual clip at a client.

FIG. 7 illustrates an embodiment of a process for obtaining a composite virtual clip at a client. For example, process 700 may be employed by a media player at the client. Process 700 starts at 702 at which an indication of a selection of an option to view a composite virtual clip is received. In some embodiments, for example, an option to view the composite virtual clip may be selected via an associated media player. In some embodiments, a selection of an option to view a composite virtual clip may comprise clicking on or otherwise selecting a hyperlink associated with the composite virtual clip or inputting a URL associated with the composite virtual clip into a web browser. At 704, data comprising a first virtual clip of the composite virtual clip is requested, e.g., by an associated media player at the client, and received from an associated server. At 706 it is determined whether the composite virtual clip comprises more virtual clips. If it is determined at 706 that the composite virtual clip comprises more virtual clips, data comprising the next virtual clip is requested and received at 708, and process 700 continues at 706. If it is determined at 706 that the composite virtual clip does not comprise any more virtual clips (i.e., all virtual clips comprising the composite virtual clip have been requested and received), process 700 ends. Although in the embodiment of process 700 virtual clips are sequentially requested in order, in other embodiments, one or more virtual clips comprising a composite virtual clip may be requested and/or received out of order and/or in parallel.

In various embodiments, the data comprising the various virtual clips may be played back by the player and/or queued to be played back as it is received. In some such cases, received data may be buffered at the client for seamless playback. In various embodiments, one or more virtual clips comprising a composite virtual clip may be requested in parallel by the player and/or may be served in parallel by one or more associated servers. In some embodiments, process 500 of FIG. 5 is employed by one or more associated servers to service requests for virtual clips. In the cases in which transitions of a composite virtual clip are requested from an associated server, process 700 may include requests for transitions (e.g., between requests for virtual clips in the cases in which data is sequentially requested in order), and such requests for transitions may be serviced by one or more appropriate servers, e.g., dedicated transition servers. In the cases in which transition processing is performed client-side by the player, the specified transitions are generated and played between corresponding virtual clips by the player. In the embodiment of process 700, the media player at the client orchestrates individually obtaining the virtual clips (and/or transitions) comprising the composite virtual clip from one or more associated servers. In other embodiments, the media player may bundle the requests for the individual virtual clips (and/or transitions) comprising the composite virtual clip and send a single request to an associated server, which would then be responsible for parsing the bundled request and providing the requested data. In some embodiments of the cases in which a composite virtual clip is accessed via a URL and/or associated hyperlink, the information of each virtual clip (and transition) comprising the composite virtual clip is included in the URL, and an associated server is configured to parse and interpret the information in the URL to provide the appropriate content.

As described, a virtual clip can be generated without creating a separate video file for the clip from a source video file. That is, the content of the source video file does not have to be modified and/or re-encoded to generate the virtual clip. Rather the definition of the virtual clip instructs a server that hosts the source video file to provide a specified portion of the source video file. Saving the definition of a virtual clip and generating a virtual clip from an associated portion of the source file requires significantly less storage and processing than encoding a desired portion of the source file into a separate file and storing that file. Thus, the low overhead makes virtual clips a more scalable solution for creating clips. In some cases, a virtual clip does not at least appear to be different from a standard video file to a user. In various embodiments, a virtual clip may be created from another virtual clip, e.g., without a user being aware that the other virtual clip is a virtual clip (i.e., is any different from a standard video file). In addition, as described, content other than that included in the specified portion of the source file may be included in a virtual clip. For example, comments, notes, pop-ups, bubbles, etc., may be included in a virtual clip. The specification or definition of such other content may include, for example, the spatial coordinates in the virtual clip at which to include such other content, associated start and stop points (e.g., time to live), etc. In various embodiments, the described techniques may be employed for video editing, video bookmarking, video sharing, etc. In some embodiments, video content associated with television is stored at one or more associated servers. A user may mark and/or create virtual clips of television content, e.g., while watching, which may be saved and later viewed and/or shared with others. In some such cases, data associated with the markings and/or virtual clips is later retrieved from the associated servers at which the television content is stored. In various embodiments, the described virtual editing techniques may be employed with respect to a client-server architecture (e.g., as depicted in FIG. 1 and described in many of the given examples) and/or entirely client-side.

Video data typically comprises a series of key frames and updates to the key frames. In some cases, if a video is started or scrubbed to a point between key frames, the video begins playing at the next key frame. In other cases, if a video is started or scrubbed to a point between key frames, the video is started at the previous key frame. In both of these cases, the video is not started at the exact point specified since it is between key frames. In some embodiments, virtual key frames may be generated for video data so that the video can be played starting at any point. A virtual key frame for a prescribed point of a video stream is generated by taking a closest previous key frame and applying all associated updates to that key frame available up to the prescribed point. In various embodiments, virtual key frames may be generated with respect to any one or more update (i.e., delta data) points in a video stream. With respect to virtual clips, for example, virtual key frames may be generated for the specified start and/or stop points, e.g., if the points are between key frames in the source file. In some embodiments, virtual thumbnails of any point of a video stream may be created using virtual key frames. For example, a virtual clip may be represented by a virtual thumbnail that corresponds to the start point of the virtual clip. In some embodiments, for a real-time or live video stream, virtual key frames may be continuously generated as updates are received between actual key frames. In such cases, when a user connects to the live video stream at a point between key frames, the video stream can be immediately served to the user starting with the current virtual key frame without any delay associated with waiting for the next actual key frame in the video stream. Thus, virtual key frames allow for improved performance in accessing video content by removing any delay associated with waiting for a next key frame. In various embodiments, virtual key frames and/or thumbnails may be generated server-side and/or client-side.

Figure 8:
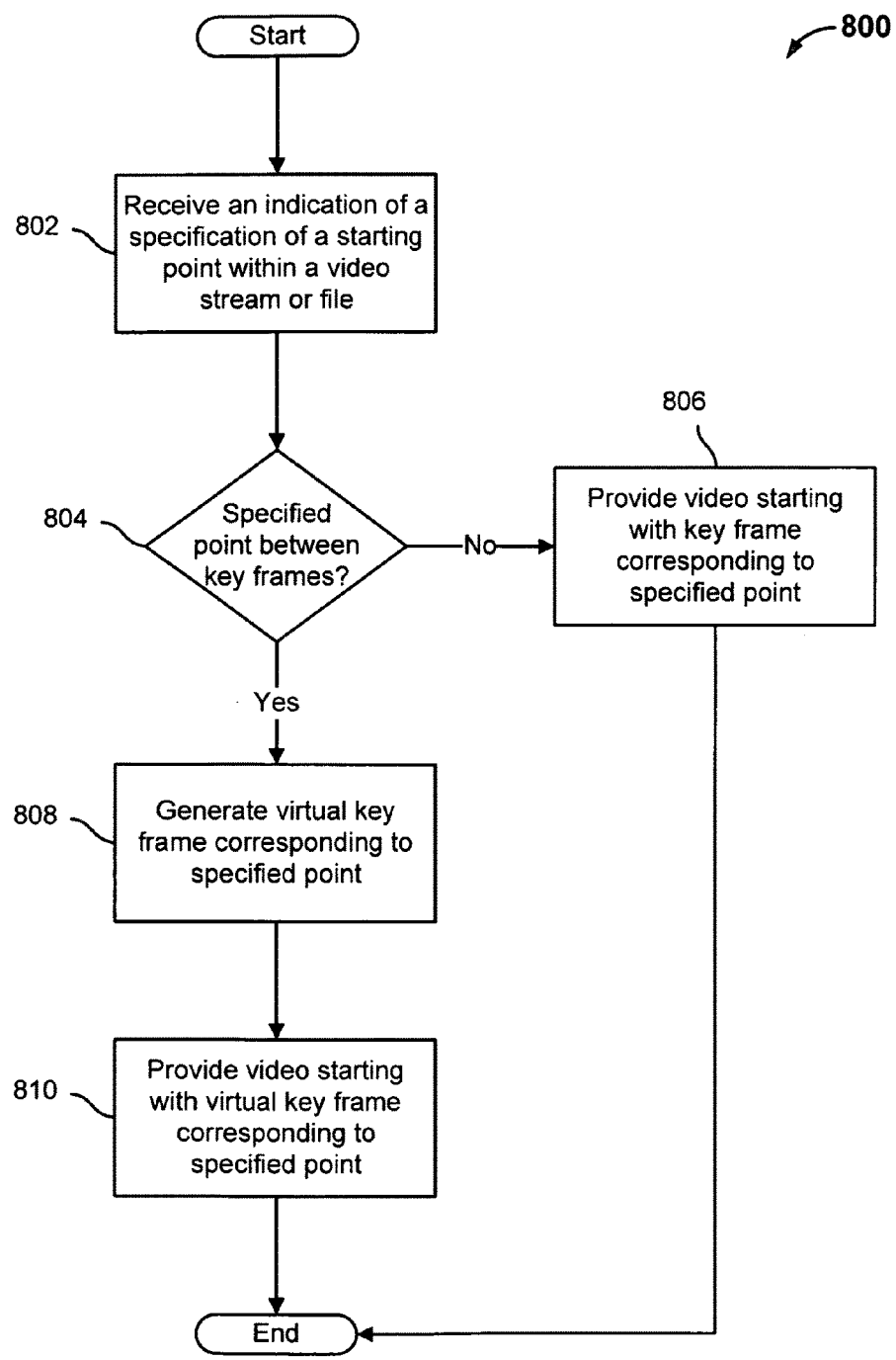
FIG. 8 illustrates an embodiment of a process for providing video content.

FIG. 8 illustrates an embodiment of a process for providing video content. Process 800 starts at 802 at which an indication of a specification of a starting point within a video stream or file is received. At 804 it is determined whether the specified point is between key frames. If it is determined at 804 that the specified point is not between key frames, the specified point corresponds to a key frame, and the video is provided starting with that key frame at 806. Process 800 subsequently ends. If it is determined at 804 that the specified point is between key frames, a virtual key frame corresponding to the specified point is generated at 808. The virtual key frame is generated at 808 by applying to the previous key frame all corresponding updates up to the specified point. At 810, the video is provided starting with the virtual key frame corresponding to the specified point that was generated at 808, and process 800 subsequently ends. In some cases, providing the video at 810 includes applying subsequent updates to the virtual key frame until the next actual key frame is reached and/or received. In some embodiments, a virtual thumbnail is generated from the virtual key frame at 808 and provided at 810.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for generating a virtual key frame, comprising: receiving, at a server, a live video stream; generating continuously, at the server, virtual key frames corresponding to received updates of the live video stream by taking a closest previous key frame of the live video stream and applying all corresponding updates of the live video stream between the closest previous key frame of the live video stream up to a prescribed point of the live video stream, wherein the virtual key frames are between actual key frames of the live video stream, the continuously generated virtual key frames are generated without a user's selection, and the live video stream is not modified to create the virtual key frames; receiving, at the server, a request from a user for the live video stream at a specific point in the live video stream; determining, at the server, that the request from the user for the live video stream at the specific point is at a point in the live video stream that is between actual key frames; transmitting, from the server to the user, the live video stream at the specified point starting with a virtual key frame generated for the specified point in the live video stream, wherein the live video stream is immediately transmitted to the user with the virtual key frame without waiting for the next actual key frame in the video stream.

2. The method recited in claim 1, further comprising applying and transmitting updates to the virtual key frame generated for the specified point until the next actual key frame is reached in the live video stream when transmitting the live video stream.

3. A system for generating a virtual key frame, comprising: a processor; and at least one memory device that stores a plurality of instructions, which when executed by the processor, cause the processor to: receive, at a server, a live video stream; generate continuously, at the server, virtual key frames corresponding to received updates of the live video stream by taking a closest previous key frame of the live video stream and applying all corresponding updates of the live video stream between the closest previous key frame of the live video stream up to a prescribed point of the live video stream, wherein the virtual key frames are between actual key frames of the live video stream, the continuously generated virtual key frames are generated without a user's selection, and the live video stream is not modified to create the virtual key frames; receive, at the server, a request from a user for the live video stream at a specific point in the live video stream, determine, at the server, that the request from the user for the live video stream at the specific point is at a point in the live video stream that is between actual key frames; transmit, from the server to the user, the live video stream at the specified point starting with a virtual key frame generated for the specified point in the live video stream, wherein the live video stream is immediately transmitted to the user with the virtual key frame without waiting for the next actual key frame in the video stream.

4. The system recited in claim 3, wherein, when transmitting the live video stream, the processor further applies and transmits updates to the virtual key frame generated for the specified point until the next actual key frame is reached in the live video stream.

5. A computer program product for generating a virtual key frame, the computer program product embodied in a non-transitory computer readable storage medium and comprising computer instructions for: receiving, at a server, a live video stream; generating continuously, at the server, virtual key frames corresponding to received updates of the live video stream by taking a closest previous key frame of the live video stream and applying all corresponding updates of the live video stream between the closest previous key frame of the live video stream up to a prescribed point of the live video stream, wherein the virtual key frames are between actual key frames of the live video stream, the continuously generated virtual key frames are generated without a user's selection, and the live video stream is not modified to create the virtual key frames; receiving, at the server, a request from a user for the live video stream at a specific point in the live video stream, determining, at the server, that the request from the user for the live video stream at the specific point is at a point in the live video stream that is between actual key frames; transmitting, from the server to the user, the live video stream at the specified point starting with a virtual key frame generated for the specified point in the live video stream, wherein the live video stream is immediately transmitted to the user with the virtual key frame without waiting for the next actual key frame in the video stream.

6. The computer program product recited in claim 5, further comprising applying and transmitting updates to the virtual key frame generated for the specified point until the next actual key frame is reached in the live video stream when transmitting the live video stream.

\* \* \* \* \*